United States Patent [19]
Gil

[11] Patent Number: 5,456,738
[45] Date of Patent: Oct. 10, 1995

[54] PORTABLE METAL EXTRACTION MACHINE AND METHOD OF USING

[76] Inventor: David J. Gil, 1356 Navarro Dr., Sunnyvale, Calif. 94087

[21] Appl. No.: 159,243

[22] Filed: May 9, 1994

[51] Int. Cl.⁶ .................................................. C22B 7/00
[52] U.S. Cl. ............... 75/403; 29/426.4; 29/762; 241/14; 241/65; 241/283; 241/DIG. 37; 266/137
[58] Field of Search ............... 75/710, 715, 403; 266/137; 241/14, 65, 283, DIG. 37; 29/762, 426.4

[56] References Cited

U.S. PATENT DOCUMENTS

| | | | |
|---|---|---|---|
| 3,885,744 | 5/1975 | Drage | 241/DIG. 37 |
| 3,912,801 | 10/1975 | Stephens | 423/8 |
| 4,020,992 | 5/1977 | Binger et al. | 241/DIG. 37 |
| 4,540,435 | 9/1985 | Miller et al. | 75/118 R |
| 4,561,947 | 12/1985 | Schulze | 204/109 |
| 4,654,145 | 3/1987 | Demopoulos et al. | 210/638 |
| 4,895,597 | 1/1990 | Lin et al. | 75/118 R |
| 4,913,730 | 4/1990 | Deschenes et al. | 75/370 |
| 5,045,290 | 9/1991 | Harris et al. | 423/22 |
| 5,070,603 | 12/1991 | Waldsmith | 29/426.4 |
| 5,229,085 | 7/1993 | Brison et al. | 423/29 |
| 5,288,760 | 2/1994 | Morgan | 241/DIG. 37 |

FOREIGN PATENT DOCUMENTS 0001979  1/1977  Japan .......................... 241/DIG. 37

*Primary Examiner*—Melvyn Andrews

[57] ABSTRACT

A process and apparatus for extracting gold from circuit boards, gold fingers and gold pins is described comprising the steps of applying liquid nitrogen directly to the surface of the circuit boards, gold fingers and gold pins, thus freezing the gold. A vibration is then instituted to loosen the gold from the substrate to which it was attached. The gold flakes or particles are then collected by a high powered vacuum apparatus.

8 Claims, 3 Drawing Sheets

5,456,738

PORTABLE METAL EXTRACTION MACHINE AND METHOD OF USING

BACKGROUND OF THE INVENTION

1. Field of the Invention

The present invention relates to a method and apparatus for extracting gold from circuit boards, gold fingers, and pins, using a non-toxic chemical.

2. Description of the Prior Art

The refining industry is currently using a cyanide compound to extract gold from circuit boards, gold fingers and gold pins. The circuit boards are first pulverized. Then, in most cases, burned before being put into a cyanide compound aqueous solution. The cyanide compound aqueous solution with the gold and silver therein has to go through several steps to remove the gold and silver therefrom.

Once the gold and silver are removed from the cyanide aqueous solution, the cyanide compound can only be recycled a few times before more cyanide has to be added. The cyanide sludge that is left once the refining has ended for the day is put into 50 gallon drums and disposed of at a toxic waste site.

Using a cyanide compound for refining circuit boards is expensive, and is not cost effective. It is also very toxic and a potential danger to the environment.

SUMMARY OF THE INVENTION

In view of the foregoing, several objects and advantages of the present invention are:

(a) a method and apparatus to provide a fast and easy process for extracting gold from circuit boards, gold fingers and pins;

(b) a method and apparatus to provide a cost effective way to extract gold from circuit boards, gold fingers and pins;

(c) a method and apparatus that can be moved to various process locations; and (d) a method and apparatus for extracting gold from circuit boards and the like that is environmentally safe, and toxic free.

BRIEF DESCRIPTION OF THE DRAWINGS

Further objects and advantages of the present invention will become apparent from the following detailed description of the accompanying drawings in which.

DETAILED DESCRIPTION OF THE INVENTION

Figure 1:
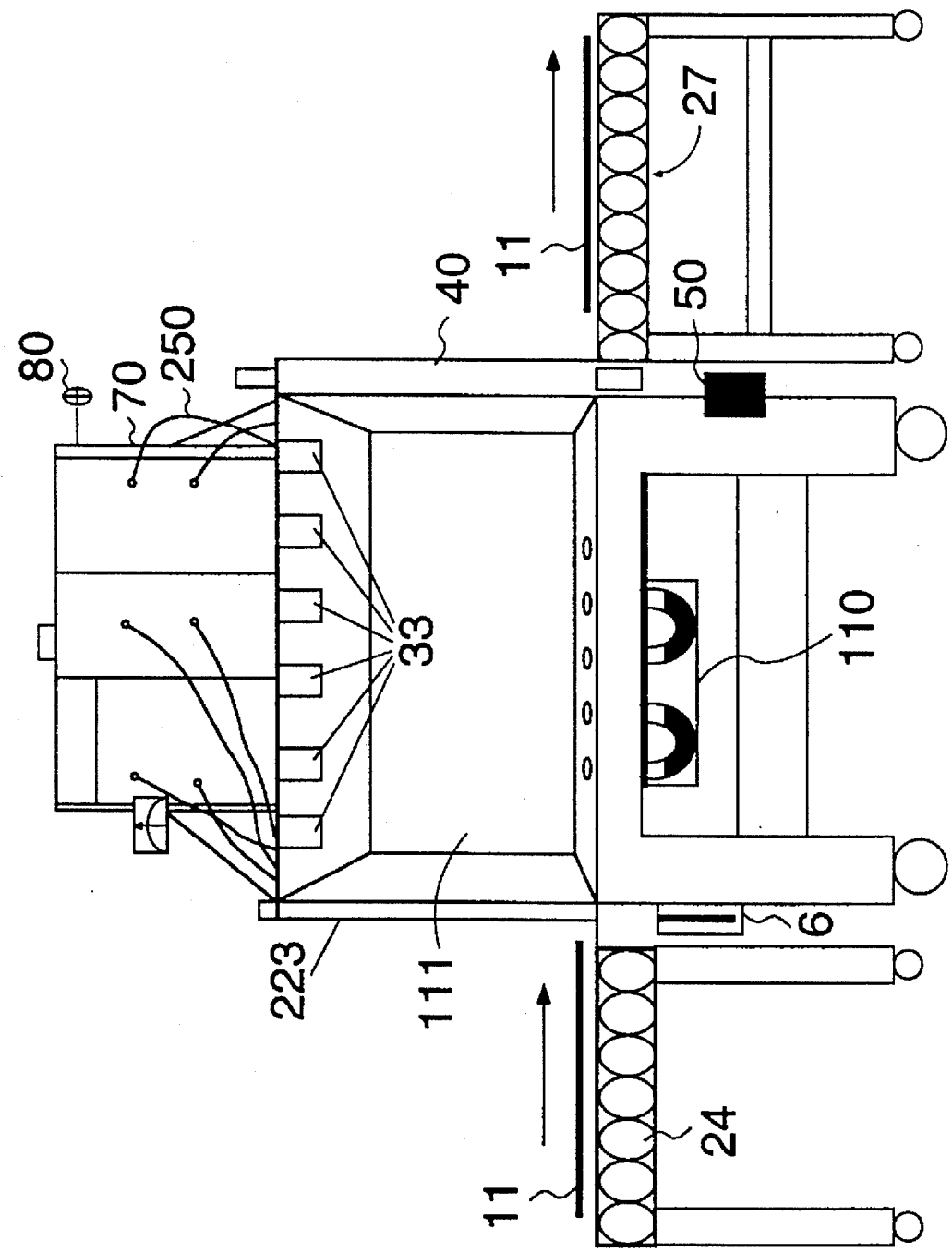
FIG. 1 is a perspective elevation view of a chamber for saturating printed circuit boards in liquid nitrogen according to the present invention.

Referring to FIG. 1, circuit boards 11 on an entrance conveyor 24 are propelled toward a chamber 111. When the boards 11 reach an entrance door sensor 6, the sensor 6 will open a chamber entrance door 223. The closing of the door 223 is delayed until the circuit boards 11 have been secured in the chamber 111. Once the circuit boards have been secured in the chamber 111, a liquid nitrogen valve 80 is manually opened. Liquid nitrogen will then travel from a main tank 70 through hoses 250 to a plurality of chamber entrance valves 33 and chamber inlet valves 110 which will saturate the circuit boards 11 for approximately 1–2 minutes. Thereafter, a chamber exit door 40 is opened manually by a machine operator.

Once the exit door 40 has been opened by a machine operator, the liquid nitrogen will evaporate. At that time the machine operator opens the chamber entrance door 223 to allow unprocessed circuit boards 11 to push the circuit boards 11 in the main chamber 111 through the chamber exit door 40 and on to an exit conveyor 27.

Figure 2:
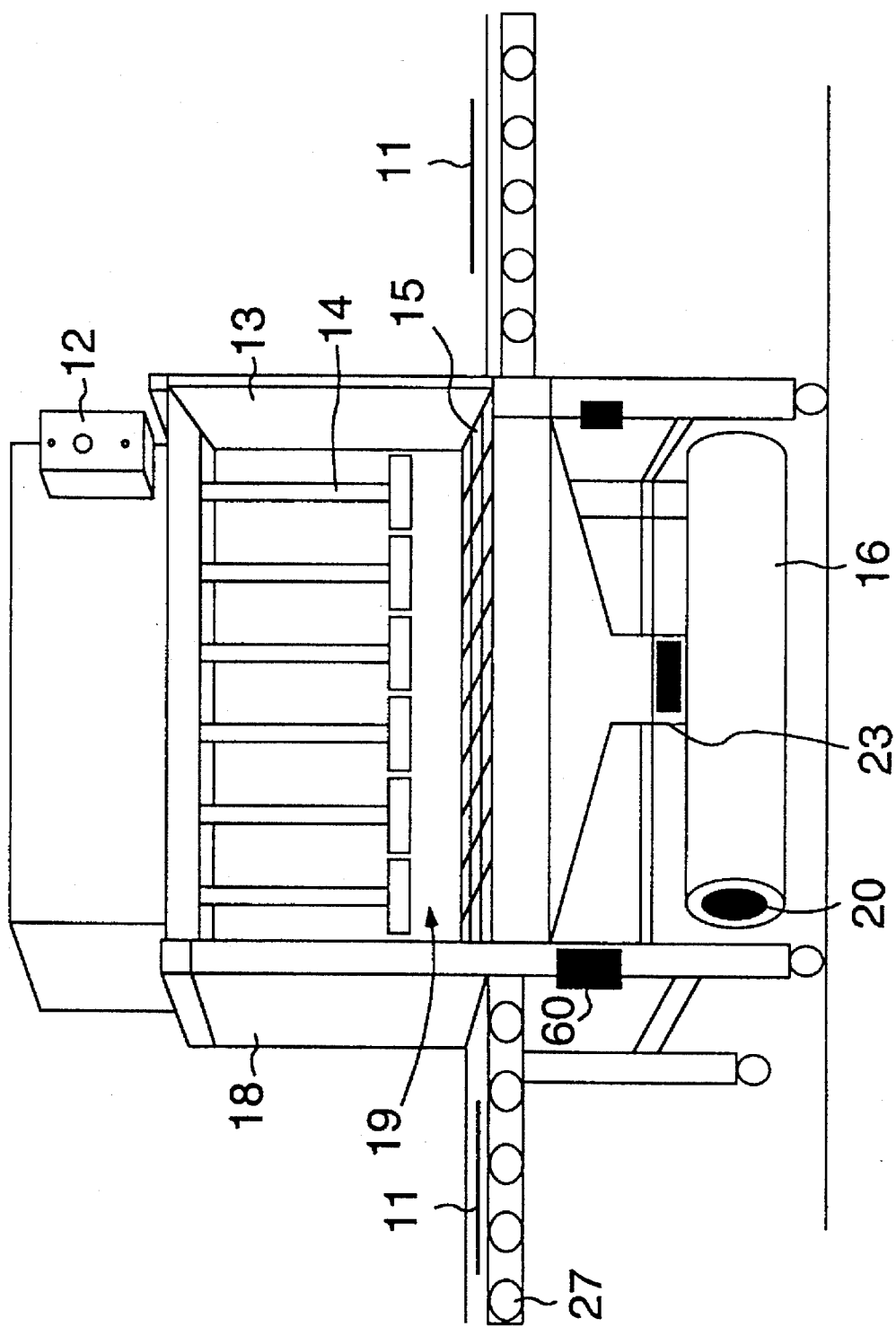
FIG. 2 is a perspective elevation view of a hydraulic hammer unit according to the present invention.
Figure 3:
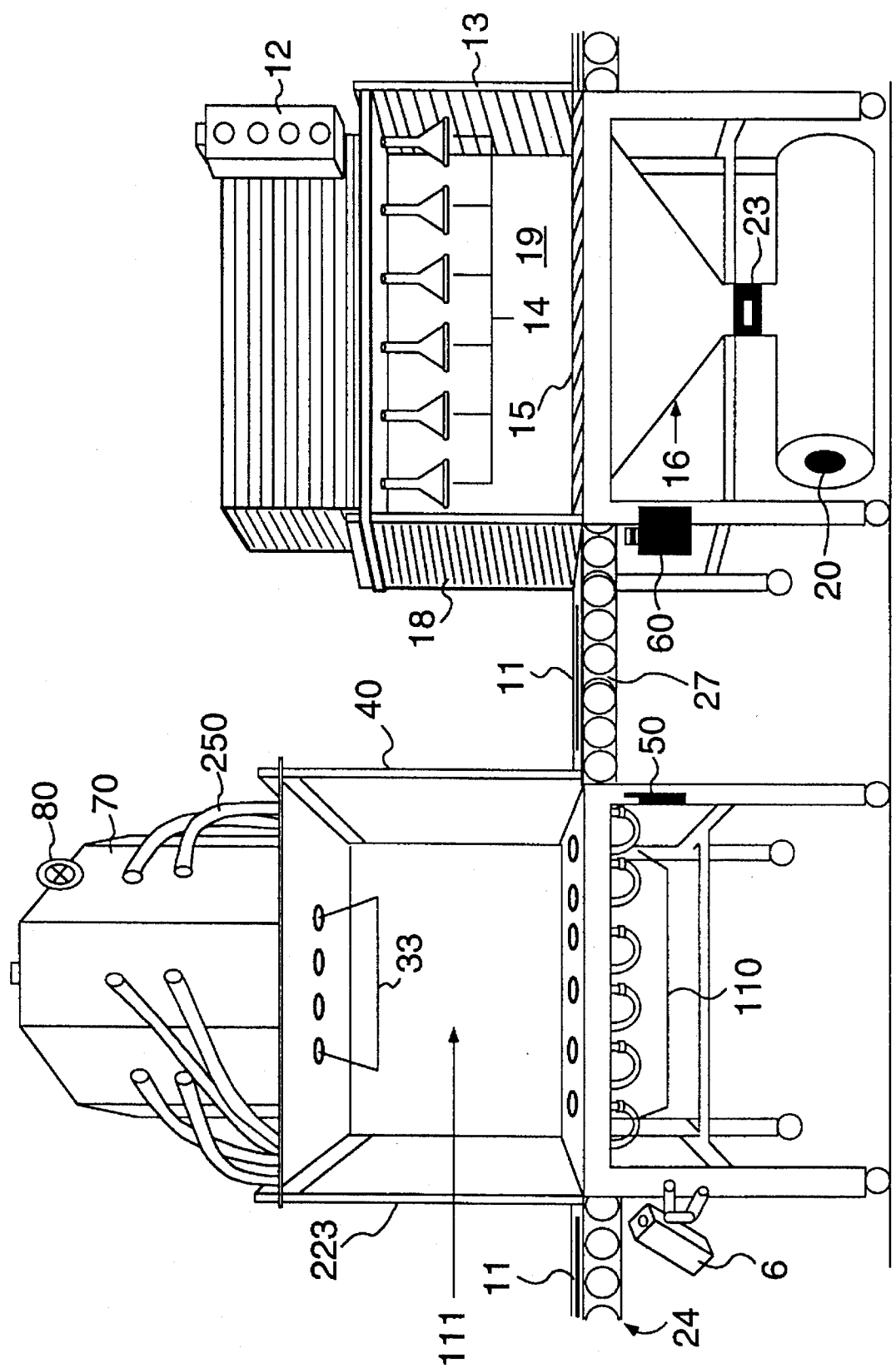
FIG. 3 is a perspective elevation view of an entire gold extraction machine according to the present invention.

Referring to FIG. 2, the circuit boards travel the conveyor 27 towards a hammer entrance door sensor 60 of a hydraulic hammer chamber 19. When the circuit boards 11 activate the hammer entrance door sensor 60 a hydraulic hammer chamber entrance door 18 will open. The circuit boards 11 will then travel across a square perforated plate 15 in the hydraulic hammer chamber 19. Once the circuit boards 11 are secured in the hydraulic hammer chamber 19 an operator will activate a main control box 12 causing a plurality of hammers 14 to strike the circuit boards 11. As the hammers 14 hit the circuit boards 11 the gold on the boards will flake off and be sucked through the perforated plate 15 down into a high powered vacuum apparatus 16. The gold is then collected from a vacuum door 20 or a vacuum coupler 23 can be removed for easy collection of the gold. The boards 11 are removed through a door 13. Thereafter circuit boards 11 can be ground up and recycled back to the companies that made them.

Although the description above contains many specificities, these should not be construed as limiting the scope of the invention but as merely providing illustrations of some of the presently preferred embodiments of this invention. For example, the portable gold extraction machine could be reduced in size to the size of a suitcase, or the nitrogen tank could be circular, triangular, etc. A person manually could dip a gold finger or circuit board into a small flask shape container full of liquid nitrogen, pull it out and hit it with a hammer. This will cause the gold to flake off. Thus the scope of the invention should be determined by the appended claims and their legal equivalents, rather than by the examples given.

What is claimed is:

1. An apparatus for extracting metal from a substrate comprising:

cooling means for cooling the substrate in liquid nitrogen until the metal freezes; and holding means for holding the substrate after the metal becomes frozen:

removal means for striking the substrate being held by the holding means causing the metal to separate from the substrate while not damaging the substrate;

collecting means for collecting the metal separated from the substrate by the removal means; and release means for removing the substrate from the apparatus after the collecting means has collected the metal separated from the substrate by the removal means.

2. An apparatus according to claim 1 wherein said collecting means comprises a vacuum apparatus for collecting the metal separated from the Substrate by the removal means.

3. An apparatus according to claim 1 wherein the removal means comprises hammer means for striking the substrate.

4. An apparatus according to claim 1 further comprising:

a first chamber housing the cooling means and in which the substrate is placed and thereafter exposed to liquid nitrogen by said cooling means for freezing the metal on the substrate;

a second chamber housing the holding means, the removal means and the release means and in which a plurality of hammer members of the removal means strikes the substrate being held by said holding means for separating the metal from the substrate;

the collecting means connected to the second chamber including a vacuum for removing the metal separated from the substrate in the second chamber; and transport means for transporting the substrate between the first and second chambers, the transport means including the release means for transporting the substrate from the second chamber.

5. A method for extracting metal from a substrate comprising the steps of:

cooling the substrate in liquid nitrogen until the metal on the substrate freezes; and holding the substrate after the metal on the substrate becomes frozen;

striking the substrate so as to separate the metal that was frozen from the substrate while not damaging the substrate;

collecting the metal that was separated from the substrate; and releasing the substrate from being held after the metal that was separated from the substrate was collected.

6. A method according to claim 5 wherein said collecting step comprises the step of vacuuming the metal removed from the substrate using a vacuum apparatus.

7. A method according to claim 5 wherein said removing step comprises the step of striking the substrate with a hammer means.

8. A method according to claim 5 wherein the cooling step is performed in a first chamber;

the holding, removal and release steps are performed in a second chamber; and the method further comprises the step of:

transporting said substrate into the first chamber, between the first and second chambers and out of said second chamber.

\* \* \* \* \*